(12) United States Patent
Takano

(10) Patent No.: US 11,092,756 B2
(45) Date of Patent: Aug. 17, 2021

(54) INGRESS PROTECTED CONNECTOR WITH AN UNITARY ORIENTATION FEATURE

(71) Applicant: Senko Advanced Components Inc, Marlborough, MA (US)

(72) Inventor: Kazuyoshi Takano, Tokyo (JP)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/592,267

(22) Filed: Oct. 3, 2019

(65) Prior Publication Data

US 2020/0116951 A1  Apr. 16, 2020

Related U.S. Application Data

(60) Provisional application No. 62/743,802, filed on Oct. 10, 2018.

(51) Int. Cl.
  *G02B 6/38* (2006.01)
(52) U.S. Cl.
  CPC ......... *G02B 6/3869* (2013.01); *G02B 6/3825* (2013.01); *G02B 6/3887* (2013.01)
(58) Field of Classification Search
  CPC ................ G02B 6/3869; G02B 6/3887; G02B 6/3825; G02B 6/3897; G02B 6/3894
  See application file for complete search history.

(56) References Cited

U.S. PATENT DOCUMENTS

| | | | |
|---|---|---|---|
| 6,116,790 A | 9/2000 | Vergeest | |
| 6,542,674 B1 | 4/2003 | Gimblet | |
| 6,546,175 B1 | 4/2003 | Wagman | |
| 6,585,423 B1 | 7/2003 | Vergeest | |
| 6,648,520 B2 | 11/2003 | McDonald | |
| 6,714,710 B2 | 3/2004 | Gimblet | |
| 6,785,450 B2 | 8/2004 | Wagman | |
| 6,899,467 B2 | 5/2005 | McDonald | |
| 7,001,079 B2 | 2/2006 | Vergeest | |
| 7,090,406 B2 | 8/2006 | Melton | |
| 7,090,407 B2 * | 8/2006 | Melton | ................ G02B 6/3849 385/147 |
| 7,111,990 B2 | 9/2006 | Melton | |
| 7,113,679 B2 | 9/2006 | Melton | |
| 7,234,875 B2 | 6/2007 | Krowiak | |
| 7,241,056 B1 | 7/2007 | Kuffel | |
| 7,264,402 B2 | 9/2007 | Theuerkorn | |
| 7,281,856 B2 | 10/2007 | Grzegorzewska | |
| 7,344,317 B2 | 3/2008 | Krowiak | |
| 7,429,236 B2 | 9/2008 | Lewallen | |
| 7,467,896 B2 | 12/2008 | Melton | |
| 7,572,065 B2 | 8/2009 | Lu | |
| 7,654,747 B2 | 2/2010 | Theuerkorn | |

(Continued)

FOREIGN PATENT DOCUMENTS

| WO | WO2010039830 A2 | 4/2010 |
|---|---|---|
| WO | WO2010039830 A3 | 6/2010 |

(Continued)

*Primary Examiner* — Ryan A Lepisto

(74) *Attorney, Agent, or Firm* — Stinson LLP

(57) ABSTRACT

Ingress protected connectors used outdoors are mated with and within an adapter. To aid in mating an orientation finger is provided as part of the proximal end of the ingress protected connector. Within the ingress protected connector is a fiber optic connector being protected from the environment.

7 Claims, 3 Drawing Sheets

(56) References Cited

U.S. PATENT DOCUMENTS

| | | |
|---|---|---|
| 7,654,748 B2 | 2/2010 | Kuffel |
| 7,744,286 B2 | 6/2010 | Lu |
| 7,744,288 B2 | 6/2010 | Lu |
| 7,762,726 B2 | 7/2010 | Lu |
| 7,785,015 B2 | 8/2010 | Melton |
| 7,785,019 B2 | 8/2010 | Lewallen |
| 7,881,576 B2 | 2/2011 | Melton |
| 7,891,882 B2 | 2/2011 | Kuffel |
| 7,918,609 B2 | 4/2011 | Melton |
| 7,942,590 B2 | 5/2011 | Lu |
| 7,959,361 B2 | 6/2011 | Lu |
| 8,052,333 B2 | 11/2011 | Kuffel |
| 8,202,008 B2 | 6/2012 | Lu |
| 8,231,282 B2 | 7/2012 | Kuffel |
| 8,297,850 B2 | 10/2012 | Nishioka |
| 8,348,519 B2 | 1/2013 | Kuffel |
| 8,414,196 B2 | 4/2013 | Lu |
| 8,496,384 B2 | 7/2013 | Kuffel |
| 8,506,173 B2 | 8/2013 | Lewallen |
| 8,573,859 B2 | 11/2013 | Larson |
| 8,672,560 B2 | 3/2014 | Haley |
| 8,699,467 B2 | 4/2014 | Lindoff |
| 8,714,835 B2 | 5/2014 | Kuffel |
| 8,770,862 B2 | 7/2014 | Lu |
| 8,840,320 B2 | 9/2014 | Park |
| 8,939,654 B2 | 1/2015 | Lu |
| 9,103,995 B2 | 8/2015 | Park |
| 9,239,441 B2 | 1/2016 | Melton |
| 9,291,780 B2 | 3/2016 | Lu |
| 9,304,262 B2 | 4/2016 | Lu |
| 9,310,570 B2 | 4/2016 | Busse |
| 9,397,441 B2 | 7/2016 | Sun |
| 9,442,257 B2 | 9/2016 | Lu |
| 9,482,829 B2 | 11/2016 | Lu |
| 9,519,114 B2 | 12/2016 | Zimmel |
| 9,535,230 B2 | 1/2017 | Newbury |
| 9,664,862 B2 | 5/2017 | Lu |
| 9,684,138 B2 | 6/2017 | Lu |
| 9,733,436 B2 | 8/2017 | Van Baelen |
| 9,739,951 B2 | 8/2017 | Busse |
| 9,854,151 B2 | 12/2017 | Endo |
| 9,964,715 B2 | 5/2018 | Lu |
| 9,983,366 B2 | 5/2018 | Bund |
| 10,012,802 B2 | 7/2018 | Newbury |
| 10,101,538 B2 | 10/2018 | Lu |
| 10,114,176 B2 | 10/2018 | Gimblet |
| 10,146,015 B2 | 12/2018 | Zimmel |
| 10,162,126 B2 | 12/2018 | Elenbaas |
| 10,180,541 B2 | 1/2019 | Coenegracht |
| 10,197,739 B2 | 2/2019 | Ohtsuka |
| 10,234,641 B2 | 3/2019 | Hill |
| 10,317,628 B2 | 6/2019 | Van Baelen |
| 10,338,323 B2 | 7/2019 | Lu |
| 10,401,578 B2 | 9/2019 | Coenegracht |
| 10,451,811 B2 | 10/2019 | Coenegracht |
| 10,473,866 B2 | 11/2019 | Newbury |
| 10,502,907 B2 | 12/2019 | Wang |
| 2006/0045428 A1 | 3/2006 | Theuerkorn |
| 2008/0273855 A1 | 11/2008 | Bradley |
| 2009/0257717 A1 | 10/2009 | Liu |
| 2010/0329267 A1 | 12/2010 | Sakamoto |
| 2011/0222826 A1 | 9/2011 | Blackburn |
| 2013/0136398 A1 | 5/2013 | Isenhour |
| 2017/0227719 A1 | 8/2017 | Zimmel |
| 2018/0224610 A1 | 8/2018 | Pimentel |
| 2018/0231720 A1 | 8/2018 | Lu |
| 2019/0107667 A1 | 4/2019 | Huang |
| 2019/0107677 A1 | 4/2019 | Coenegracht |
| 2019/0146161 A1 | 5/2019 | Elenbaas |
| 2019/0179088 A1 | 6/2019 | Zimmel |
| 2019/0235177 A1 | 8/2019 | Lu |
| 2019/0302389 A1 | 10/2019 | Newbury |
| 2019/0324217 A1 | 10/2019 | Lu |
| 2019/0369336 A1 | 12/2019 | Van Baelen |
| 2020/0003965 A1 | 1/2020 | Coenegracht |
| 2020/0012051 A1 | 1/2020 | Coenegracht |

FOREIGN PATENT DOCUMENTS

| | | |
|---|---|---|
| WO | WO2016073273 A2 | 5/2016 |
| WO | WO2016073273 A3 | 6/2016 |
| WO | WO2018157115 A1 | 8/2018 |
| WO | WO2019173350 A1 | 9/2019 |

* cited by examiner

INGRESS PROTECTED CONNECTOR WITH AN UNITARY ORIENTATION FEATURE

RELATED APPLICATIONS

This application claims priority to U.S. Pat. Appl. No. 62/743,802 filed Oct. 10, 2018, titled "Ingress Protected Connector with an Unitary Orientation Feature", which is incorporated by reference into this application.

FIELD OF THE INVENTION

The described technology generally relates to outdoor connector assemblies configured to provide ingress protection against debris, water and other foreign matter. The ingress protected connector has a separate fiber optic connector secured therein. The present invention is directed to a connector with an orientation feature to align the connector into an adapter for mating to an opposing fiber optic connector.

BACKGROUND

The efficiency and reliability of telecommunication networks is dependent on various factors, such as the quality of connections between cable segments, network equipment, devices, and other cable segments. Telecommunication equipment is increasingly being used in harsh environments, including factories, motor vehicles, industrial equipment, military equipment, and on cellular antennae towers. In such environments, conventional connection assemblies often become unintentionally disconnected due to vibration, impact, temperature changes, and exposure to other harsh environmental conditions. In addition, the connection between components may be negatively effected by the ingress of dust, dirt, moisture, and/or other contaminants. Fiber optic network segments are particularly vulnerable because fiber optic connections require extremely precise termination and alignment between connected components and cable segments. Accordingly, telecommunication network providers would benefit from a connection assembly capable of maintaining a secure connection and preventing the ingress of unwanted contaminants in harsh environments.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In one aspect, an ingress protected connector has an unitary finger or protrusion at a proximal end of the connector itself. The finger is configured to be accepted into a corresponding adapter. The orientation finger is used to align and orient the ingress protected connector into and with a corresponding adapter inner structure which is not visible during mating the adapter and ingress protected connector of the present invention.

BRIEF DESCRIPTION OF THE DRAWINGS

The above and other objects of the present invention will become more readily apparent from the following detailed description taken in connection with the accompanying drawings.

DETAILED DESCRIPTION

The described technology generally relates to ingress protected connectors with an orientation feature generally at a proximal end of the connector. This ingress protected connector is used outdoors, and mated with an adapter that together with other fiber optic components forms a network that may include any type of network capable of transmitting signals, electricity, or any other type of transmission medium. For example, the network may include, without limitation, a communication network, a telecommunication network, an electrical network, a data network, a computer network, and any combination thereof. In some embodiments, the network may include a communication network using various signal transmission mediums, including, without limitation, fiber optic networks, Ethernet networks, cable and/or satellite television networks, and any other type of communication network now known or developed in the future. In some embodiments, the ingress protected connector with an orientation feature may be configured to connect cable segments and/or devices within a fiber optic network using various standard connector types, including, but not limited to LC, ST, SC, FC, DIN, D4, SMA, E2000, Biconic, FullAXS, OCD, and/or MPO. In some embodiments, the lockable connection assemblies may be configured to meet various standards, such as the British Standards Institution (BSI), the Open DeviceNet Vendors Association (ODVA), and/or the like. In some embodiments, the lockable connection assemblies may be used with copper-type network connections, such as RJ-45 type connectors.

According to some embodiments, the ingress protected orientation featured connector may be configured to lock itself to a connection assembly adapter (for instance, a receptacle, female connector, adapter, or "lockable adapter") (collectively, the "connection components" or "complementary mating components"), or vice versa.

The described technology provides multiple technological advantages. A non-limiting example of an advantage is that the connection between connection components may be maintained in harsh environments in which the mated connectors and adapters lockable connection assembly may be subjected to forces due to such as vibrations, impact, temperature change, moisture, wind, or the like.

Figure 1:
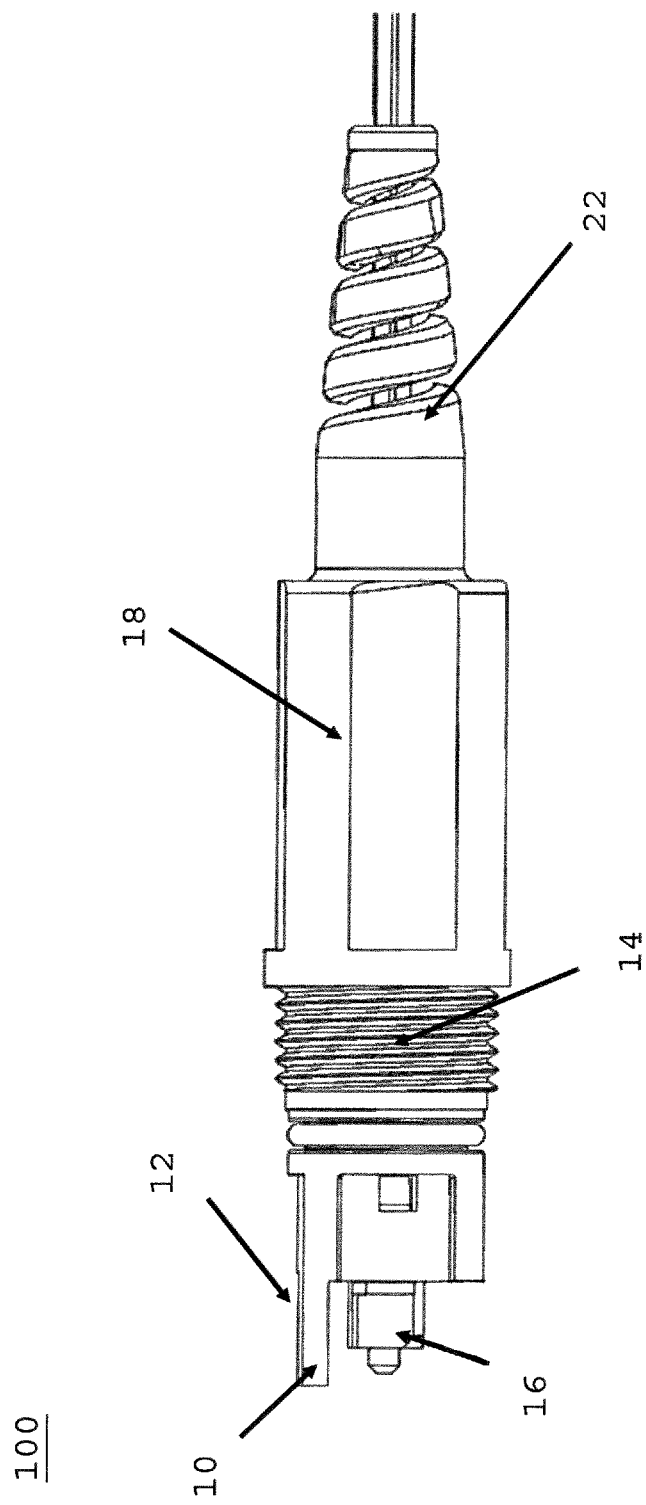
FIG. 1 is a perspective side view of an ingress protected connector with an unitary orientation finger.

FIG. 1 depicts ingress protected connector 100 with unitary finger 10 sometimes called an orientation finger. Unitary finger 10 may have flat surface 12 that mates to corresponding structure with an adapter (not shown). Since the adapter has the corresponding structure, generally a cut-out sized and shaped to accept unitary finger 10, upon inserting connector 100, unitary finger 10 orients connector 100 in one direction and then aligns connector 100 for mating with and within the adapter. Threads 14 on outer housing 18 can then be secured to a corresponding inner tread at the adapter interface, which secures connector 100 within the adapter thereby locking connector 100 or mating connector 100 to adapter.

Still referring to FIG. 1, plug frame 20 or housing 20 (refer to FIG. 2) secures fiber optic assembly 16, which may be a SC fiber optic connector that is generally known in the prior art. Fiber optic assembly 16 has at least ferrule 16*a* with an optical fiber therein provide cable 24. (refer to FIG. 2) Cable 24 is secured to crimp ring 26 (refer to FIG. 3) and cable 24 passes through a bore in cable boot 22. Other ferrules as a mechanical transfer ferrule or MT ferrule formed as part of a MPO connector may be used in place of the SC connector. Connector 16 mates within a corresponding connector or adapter within the adapter to form a signal path. Referring to FIG. 1 outer housing 18 protects plug frame 20 which holds fiber optic connector assembly 16.

Figure 2:
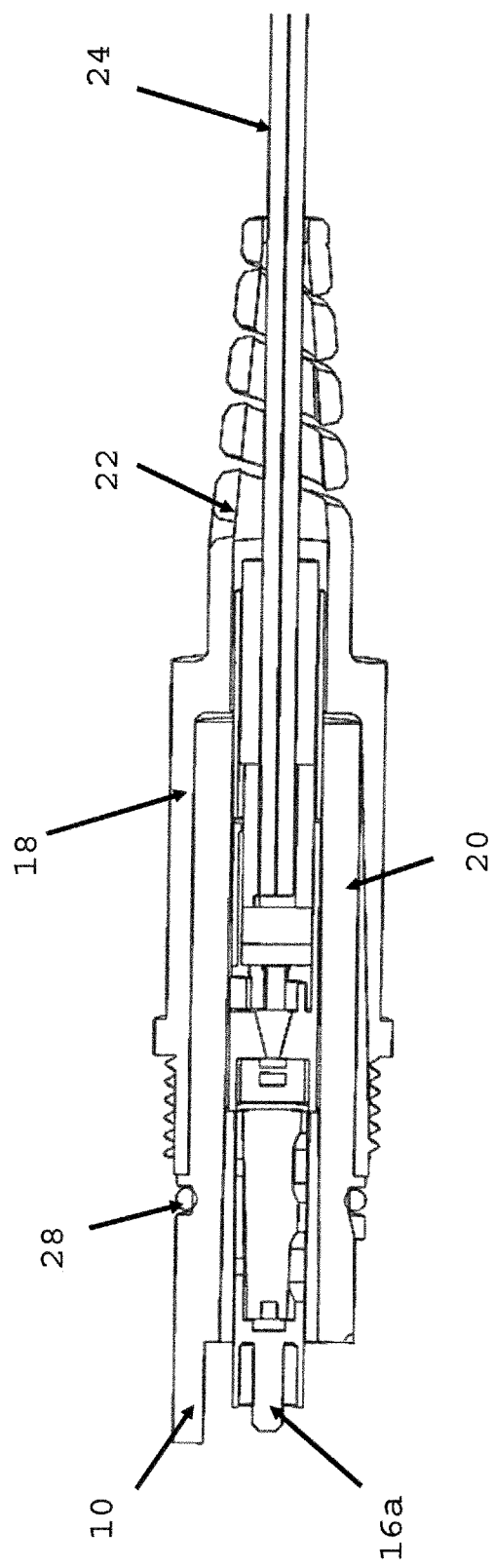
FIG. 2 is a cross-section of the connector of FIG. 1.
Figure 3:
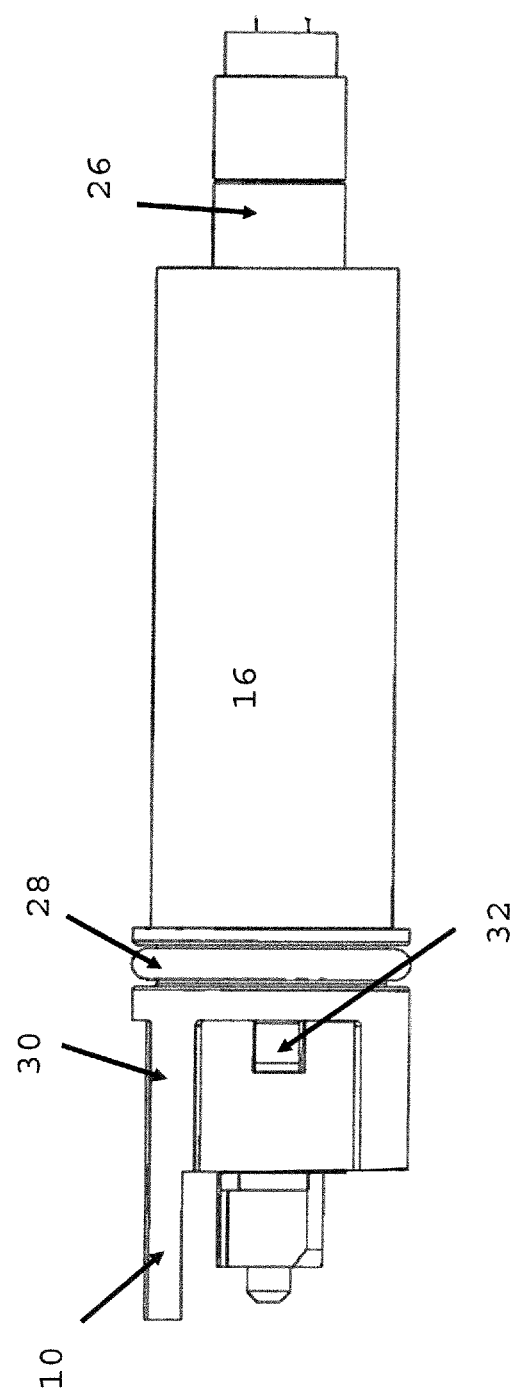
FIG. 3 is a perspective side view of the ingress protected connector.

Referring to FIG. 2, O-ring 28 or seal 28 is sized and shaped to secure with a corresponding adapter interface to form a water tight, debris tight seal to ingress protect connector 100. Referring to FIG. 3, latch 32 secures fiber optic connector 16 assembly within a proximal end of plug frame 20. Front portion 30 has integrated unitary finger 10. The distal end of connector 100 is located nearer cable boot 22.

The locking of the connection components and connection assemblies according to some embodiments also operates to prevent the ingress of contaminants into the connection interface.

Although a fiber optic connector has been used as an illustrative embodiment, this detailed description is not so limited, as any type of electrical and/or communication connector may be used according to some embodiments. The connectors, adapters, and lockable components thereof may be used in combination with other connection elements and/or materials, such as crimpers, bands, straps, ferrules, locking materials, fluids, gels, or the like.

It will be appreciated that various of the above-disclosed and other features and functions, or alternatives thereof, may be desirably combined into many other different systems or applications.

What is claimed is:

1. An ingress protected connector, comprising:
    a plug frame configured to accept a fiber optic connector;
    the plug frame accepts a sealing surface that mates with a corresponding adapter interface to protect against water and debris ingress; and
    the plug frame having a front end portion and a rear end portion spaced apart along a longitudinal center axis;
    the front portion of the plug frame comprising a forwardly facing end face and a single integrated unitary finger projecting forward from the forwardly facing end face along the longitudinal center axis, the single integrated unitary finger comprising a flat surface for orienting the ingress protected connector upon insertion and mating to the adapter interface;
    wherein the single integrated unitary finger is the only portion of the plug frame that projects forward from the forwardly facing end face.

2. The ingress protected connector of claim 1, wherein the sealing surface is an O-ring.

3. The ingress protected connector of claim 1, further comprising
    an outer housing including a threaded portion near a proximal end of the ingress protected connector for securing to an adapter.

4. The ingress protected connector of claim 1, further comprising a cable and a crimp ring, the crimp ring securing the cable at a distal end of the ingress protected connector, the cable further comprising at least one optical fiber for connection to a fiber optic connector secured at a proximal end of the plug frame.

5. The ingress protected connector as set forth in claim 1, wherein the plug frame has first and second halves separated by an imaginary middle plane located on the longitudinal center axis and wherein the first half of the plug frame defines an entirety of the single integrated unitary finger.

6. The ingress protected connector as set forth in claim 5, wherein the forwardly facing end face defines a forward-most location of the second half of the plug frame.

7. The ingress protected connector as set forth in claim 6, wherein the forwardly facing end face extends in an end face plane oriented transverse to the imaginary middle plane and wherein no portion of the plug frame is forward of the end face plane except for the single integrated unitary finger.

* * * * *